United States Patent
Huang et al.

(10) Patent No.: US 9,137,245 B2
(45) Date of Patent: Sep. 15, 2015

(54) LOGIN METHOD, APPARATUS, AND SYSTEM

(71) Applicant: TENCENT TECHNOLOGY (SHENZHEN) COMPANY LIMITED, Shenzhen (CN)

(72) Inventors: Tianqing Huang, Shenzhen (CN); Xinqi Liu, Shenzhen (CN); Jinfu Deng, Shenzhen (CN); Yingxia Lin, Shenzhen (CN); Zhenan Guan, Shenzhen (CN); Hao Zhou, Shenzhen (CN); Ming Zeng, Shenzhen (CN); Yuejun Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 17 days.

(21) Appl. No.: 14/090,319

(22) Filed: Nov. 26, 2013

(65) Prior Publication Data

US 2014/0325628 A1    Oct. 30, 2014

Related U.S. Application Data

(63) Continuation of application No. PCT/CN2013/076395, filed on May 29, 2013.

(30) Foreign Application Priority Data

Apr. 26, 2013  (CN) .......................... 2013 1 0150578

(51) Int. Cl.
*H04L 29/00*    (2006.01)
*H04L 29/06*    (2006.01)
*H04W 12/06*    (2009.01)

(52) U.S. Cl.
CPC ........ *H04L 63/0853* (2013.01); *H04L 63/0876* (2013.01); *H04L 63/18* (2013.01); *H04W 12/06* (2013.01)

(58) Field of Classification Search
CPC ................................. H04L 29/06; G06F 7/04
USPC .............................................................. 726/7
See application file for complete search history.

(56) References Cited

U.S. PATENT DOCUMENTS 8,272,032 B2 *  9/2012  Choti et al. ....................... 726/2
8,365,258 B2 *  1/2013  Dispensa .......................... 726/5

* cited by examiner

*Primary Examiner* — Brandon Hoffman
*Assistant Examiner* — Michael D Anderson
(74) *Attorney, Agent, or Firm* — Anova Law Group, PLLC (57) ABSTRACT

Various embodiments provide methods, apparatus, and systems for logging in an application account. A request for logging in an application account sent from a first terminal can be received. It is detected if the first terminal can be included in frequently used terminals corresponding to the application account. First verification information can be sent to a second terminal bound with the application account, when it is detected the first terminal is not included in the frequently used terminals corresponding to the application account. Second verification information can be received from the first terminal to detect if the second verification information matches the first verification information. When it is detected that the second verification information matches the first verification information, the request for logging in the application account can be responded.

20 Claims, 8 Drawing Sheets

LOGIN METHOD, APPARATUS, AND SYSTEM

CROSS-REFERENCES TO RELATED APPLICATIONS

This application is a continuation of PCT Patent Application No. PCT/CN2013/076395, filed on May 29, 2013, which claims priority to Chinese Patent Application No. CN 201310150578.0, filed on Apr. 26, 2013, the entire contents of all of which are incorporated herein by reference.

FIELD OF THE DISCLOSURE

The present disclosure relates to the field of computer and, more particularly, relates to methods, apparatus, and systems for logging in an application account.

BACKGROUND

With continuous development of computer technologies, more and more network applications are used in on daily basis. Each network application requires own login information, including login name and login password. A user may use various network applications and may need to memorize all login information corresponding to each network application, which is often challenging.

Some service providers provide various network applications and allow a user to bind additional login information with the various network applications. The user may bind the login information corresponding to the most frequently used network applications (selected from the various network applications provided by the service providers) with other network applications. In this case, the user only needs to use the login information corresponding to the most frequently used network applications to login in all network applications provide by the service provider.

Login information leakage of the network applications may occur, especially to those frequently used network applications. When a certain network application is bound with the additional login information and once the additional login information has been leaked, this certain network application can then be logged in by undesired other users with low Internet security.

BRIEF SUMMARY OF THE DISCLOSURE

According to various embodiments, there is provided a method for a login method for a server. A request for logging in an application account sent from a first terminal can be received. It is detected if the first terminal can be included in frequently used terminals corresponding to the application account. First verification information can be sent to a second terminal bound with the application account, when it is detected the first terminal is not included in the frequently used terminals corresponding to the application account. Second verification information can be received from the first terminal to detect if the second verification information matches the first verification information. When it is detected that the second verification information matches the first verification information, the request for logging in the application account can be responded.

According to various embodiments, there is also provided a login method for a first terminal. A request for logging in an application account can be sent to a server. Second verification information inputted in the first terminal can be received. The second verification information can include information inputted according to first verification information. The first verification information can include information sent to a second terminal when the server detects that the first terminal is not included in frequently used terminals corresponding to the application account. The second verification information can be sent to the server to detect if the second verification information matches the first verification information. When the server detects that the second verification information matches the first verification information, the application account can be logged in.

According to various embodiments, there is further provided a login verification apparatus. The apparatus can include a login request receiving module, a frequently used account detection module, a first verification information sending module, a second verification information receiving module, a verification information detection module, and a login responding module. The login request receiving module can be configured to receive a request for logging in an application account sent from a first terminal. The frequently used account detection module can be configured to detect if the first terminal is included in frequently used terminals corresponding to the application account. The first verification information sending module can be configured to send first verification information to a second terminal bounded with the application account, when the frequently used account detection module detects that the first terminal is not included in the frequently used terminals corresponding to the application account. The second verification information receiving module can be configured to receive second verification information sent from the first terminal. The verification information detection module can be configured to detect if the second verification information received by the second verification information receiving module matches the first verification information sent by the first verification information sending module. The login responding module can be configured to respond to the request for logging in the application account, when the verification information detection module detects that the second verification information matches the first verification information.

According to various embodiments, there is further provided a login apparatus. The login apparatus can include a first terminal. The first terminal can include a login request sending module, a second verification information receiving module, a second verification information sending module, and a login module. The login request sending module can be configured to send a request for logging in an application account to a server. The second verification information receiving module can be configured to receive second verification information inputted in the first terminal. The second verification information can include information inputted according to first verification information. The first verification information can include information sent to the second terminal when the server detects that the first terminal is not included in frequently used terminals corresponding to the application account. The second verification information sending module can be configured to send to the server the second verification information received by the second verification information receiving module for the server to detect if the second verification information matches the first verification information. The login module can be configured to login the application account when the server detects that the second verification information matches the first verification information.

According to various embodiments, there is further provided a server including the disclosed login verification apparatus; a terminal including the disclosed login apparatus; a login system including the disclosed server; and/or a login system including the disclosed terminal.

In one embodiment, it is detected if the first terminal that requests for logging in the application account is a frequently used terminal. If the first terminal is not the frequently used terminal corresponding to the application account, the first verification information can be sent to the second terminal bound with the application account. The second verification information is then received by the first terminal and can be detected if it matches the first verification information. If they are matched, the request for logging in the application account can be responded. As such, the problems that the network application may be logged in by undesired other users when login information leakage occurs can be solved. Security of the application accounts can be improved.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
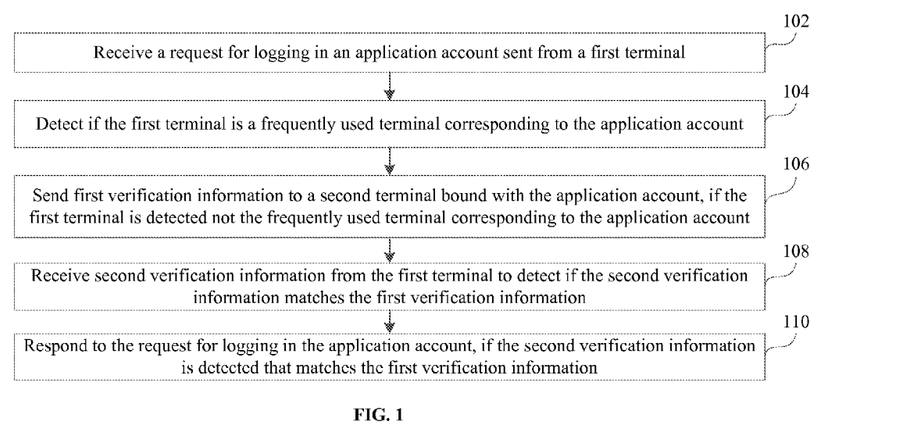
FIG. 1 depicts an exemplary login method in accordance with various disclosed embodiments.

FIG. 1 depicts an exemplary login method in accordance with various disclosed embodiments. In the exemplary login method, a server may respond to a request for logging in an application account sent from a terminal.

In Step 102, a request for logging in an application account sent from a first terminal is receive. In Step 104, it is detected if the first terminal is a frequently used terminal corresponding to the application account. In Step 106, if the first terminal is detected not the frequently used terminal corresponding to the application account, first verification information is sent to a second terminal bound with the application account. In Step 108, second verification information sent from the first terminal is received to detect if the second verification information matches the first verification information. In Step 110, if the second verification information is detected that matches the first verification information, the request for logging in the application account is responded.

In this manner, it is detected if the first terminal that requests for logging in the application account is a frequently used terminal. If the first terminal is not the frequently used terminal corresponding to the application account, then the first verification information can be sent to the second terminal bound with the application account. The second verification information is then received by the first terminal and can be detected if it matches the first verification information. If they are matched, the request for logging in the application account can be responded. As such, the problems that the network application may be logged in by undesired other users when login information leakage occurs can be solved. Security of the application accounts can be improved.

Figure 2:
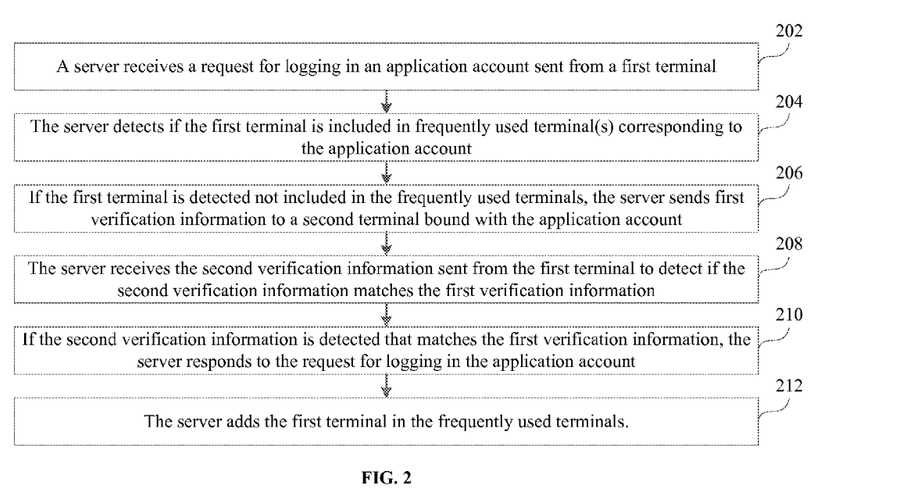
FIG. 2 depicts another exemplary login method in accordance with various disclosed embodiments.

FIG. 2 depicts another exemplary login method in accordance with various disclosed embodiments. In the exemplary login method, a server may respond to a request for logging in an application account sent from a terminal.

In Step 202, a server receives a request for logging in an application account sent from a first terminal. For example, such request for logging in an application account may contain login information and identification (ID) of the first terminal. The login information may include login name and login password. The ID of the first terminal may include an identity or an identification code of the first terminal, such as, for example, an International Mobile Equipment Identity (IMEI) of a mobile phone.

Further, the login information of the application account can include first login information and second login information. The first login information can include, for example, original login information of the application account. The second login information can include, for example, additional login information bound with the application account.

In an exemplary embodiment, when a user applies for an application account, the server may assign a unique first login name to the application account. The user may set a first login password for the first login name. The first login name and the first login password can be included in the first login information of the application account. In addition, the server may allow the user to bind the additional login information, designated by the server, with the application account. For example, to bind an email address of a designated type of email, the bound email address and the login password of this email can be included in the second login information of the application account. The user may log in the application account via the first login information or the second login information.

In Step 204, the server detects if the first terminal is included in frequently used terminal(s) corresponding to the application account.

For example, according to the ID of the first terminal, the server may detect if the first terminal is included in the frequently used terminals. In an exemplary embodiment, the server may inquire an ID list of the frequently used terminals corresponding to the application account and detect if the ID of the first terminal exists in the ID list of the frequently used terminals. If the ID of the first terminal does not exist in the ID list of the frequently used terminals, it is determined that the first terminal is not included in the frequently used terminals corresponding to the application account.

In one embodiment, as the server detects if the first terminal is included in the frequently used terminals of the application account, other conditions can also be incorporated to determine if such detecting process needs to be performed.

For example, according to the login information included in the request for logging in the application account, the server may detect if a first pre-determined condition is established. If it is detected that the first pre-determined condition is established, the method depicted in FIG. 2 proceeds to detect if the first terminal is included in the frequently used terminals corresponding to the application account. The first pre-determined condition may include that the application account has opened an account protection function or that the login information includes the second login information.

In an exemplary embodiment, if the server detects that the application account has opened the account protection function and the first terminal logs in via the additionally bound second login information, the method depicted in FIG. 2 can proceed to detect if the first terminal is contained in the frequently-used terminal corresponding to the application account. In some cases if it is detected that the application account has not opened the account protection function and/or the first terminal can log in the application account via the first login information, there is no need to detect if the first terminal is included in the frequently-used terminals corresponding to the application account, and the server may directly detect, according to the login information contained in the request for logging in the application account sent from the first terminal, if the first terminal is allowed to log in the application account.

In Step 206, if the first terminal is detected not included in the frequently used terminals corresponding to the application account, the server sends first verification information to a second terminal bound with the application account.

If the first terminal is detected not included in the frequently used terminals corresponding to the application account, the server may consider that the application account is illegally logged in. At this time, the server may send first verification information to the second terminal bound with the application account. For example, if the second terminal has a function for receiving a message, the server may send a verification message to the second terminal. The verification message may contain the first verification information.

In an exemplary embodiment, the second terminal may be a mobile phone and the user may pre-bind a phone number of the mobile phone with the application account. When the server detected that the first terminal is not included in the frequently used terminals of the application account, the server may, according to the phone number bound with the application account, send to the second terminal a message containing a verification code, e.g., referred to as a first verification code.

In Step 208, the server receives the second verification information sent from the first terminal to detect if the second verification information matches the first verification information. The second verification information sent from the first terminal can be information inputted by the user in the first terminal based on the first verification information received by the second terminal.

In Step 210, if the second verification information is detected that matches the first verification information, the server responds to the request for logging in the application account. The server may detect if the second verification information and the first verification information are matched. If they are matched (i.e., the detection is successful), the server may allow the first terminal to login the application account.

In Step 212, the server adds the first terminal in the frequently used terminals. The server may determine if number of IDs in the ID list of the frequently used terminals reaches a pre-determined threshold. If the number of IDs in the ID list of the frequently used terminals is less than the pre-determined threshold, the server may directly add the ID of the first terminal to the ID list of the frequently used terminal. In some cases if the pre-determined threshold is reached, the server may first remove an ID of another terminal that is most recently logged in at an earliest time, from the ID list of the frequently used terminals. The ID of the first terminal may then be added to the ID list of the frequently used terminals.

In addition, the server may, when other additional conditions are detected, add an ID in the ID list of the frequently used terminals. For example, when the application account has bound with the second terminal, if a request for binding the second login information with the application account is received and achieved, the ID of a terminal currently logged in the application account can be added to the ID list of the frequently used terminals. Alternatively, when the application account has bound with the second login information, if a request for binding the second terminal with the application account is received and achieved, the ID of a terminal currently logged in the application account can be added to the ID list of the frequently used terminals.

Alternatively, when the application account has bound with the second terminal and the second login information, and an account protection function of the application account is closed, if a request for opening the account protection function of the application account is sent, the server may send the first verification information to the second terminal and receive the second verification information sent by a terminal currently logged in the application account. After the second verification information and the first verification information are verified that matches with each other, the account protection function of the application account can be opened. Meanwhile, the ID of the terminal currently logged in the application account can be added to the ID list of the frequently used terminals.

In an exemplary embodiment, the server may further allow the user to edit the ID list of the frequently used terminal. For example, the user may be allowed to delete an ID of a terminal in the ID list and/or to rename an ID of a terminal in the ID list. For example, the server may send the ID list of the frequently used terminals to the first terminal, such that the first terminal can display the ID list of the frequently used terminals. The server may receive a request for editing the ID list of the frequently used terminals from the first terminal and edit the ID list of the frequently used terminals according to the request for editing the ID list of the frequently used terminals.

Further, when detecting if the first terminal is included in the frequently used terminals corresponding to the application account and if it is detected that the first terminal is not included in the frequently used terminals corresponding to the application account, the server may sent to the application account an abnormal terminal login notification. The abnormal terminal login notification can be a notification indicating that a non-frequently-used terminal requests for a login to the application account.

Figure 3:
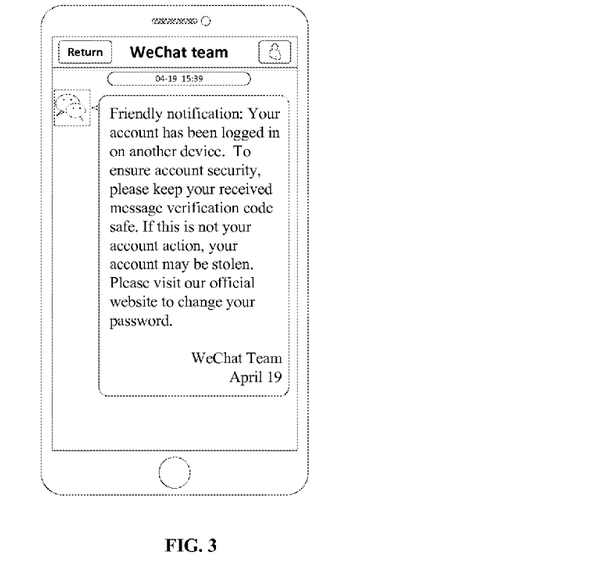
FIG. 3 depicts a flow diagram for information notification in accordance with various disclosed embodiments.

Specifically, FIG. 3 depicts a flow diagram of information notification as described above. When the server detects that the first terminal logs in the application account via the additionally bound second login information and the first terminal is not included in the frequently used terminals of the application account, the server may send a notification message to the application account to notify the user that the second login information bound with the application account has likely been leaked to remind the user regarding account security.

In this manner, it is detected if the first terminal that requests for logging in the application account is a frequently used terminal. If the first terminal is not the frequently used terminal corresponding to the application account, the first verification information can be sent to the second terminal bound with the application account. The second verification information is then received by the first terminal and can be detected if it matches the first verification information. If they are matched, the request for logging in the application account can be responded. As such, the problems that the network application may be logged in by undesired other users when login information leakage occurs can be solved. Security of the application accounts can be improved.

Figure 4:
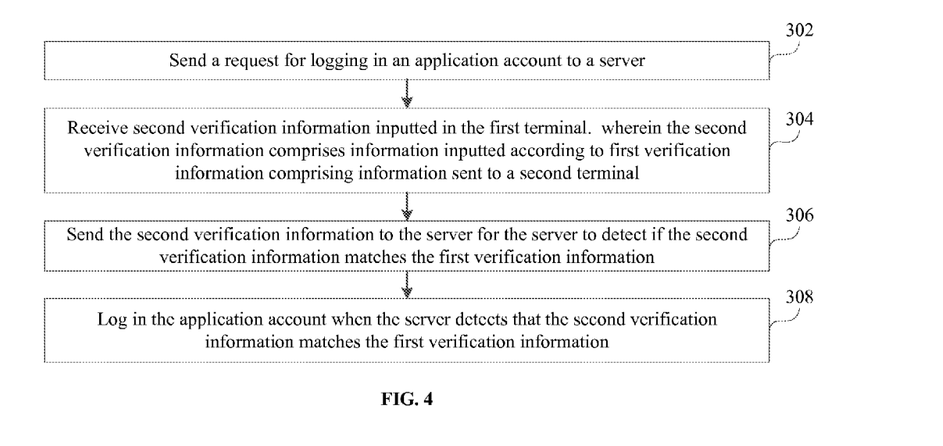
FIG. 4 depicts another exemplary login method in accordance with various disclosed embodiments.

FIG. 4 depicts an exemplary login method in accordance with various disclosed embodiments. The exemplary login method may include a first terminal to login an application account.

In Step 302, a request for logging in an application account is sent to a server. In Step 304, second verification information inputted in the first terminal is received. The second verification information includes information inputted according to first verification information. The first verification information may be information sent to the second terminal, when the server detects that the first terminal is not included in the frequently used terminals corresponding to the application account.

In Step 306, the second verification information is sent to the server such that the server can detect if the second verification information matches the first verification information. In Step 308, the application account is logged in when the server detects that the second verification information matches the first verification information.

In this manner, as shown in FIG. 4, when requesting the server for logging in the application account, the second verification information inputted in the first terminal according to the first verification information is sent to the server to detect if the second verification information matches the first verification information. After the server has verified the matching there-between, the application account is logged in. The first verification information is information sent to the second terminal when the server detects that the first terminal is not included in the frequently used terminals corresponding to the application account. As such, the problems that the network application may be logged in by undesired other users when login information leakage occurs can be solved. Security of the application accounts can be improved.

Figure 5:
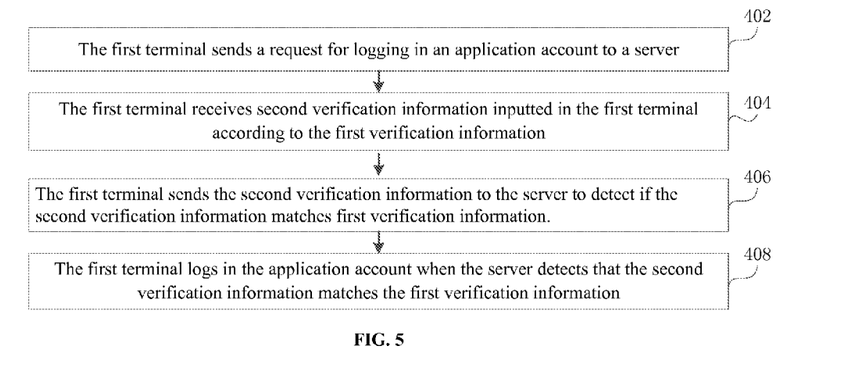
FIG. 5 depicts another exemplary login method in accordance with various disclosed embodiments.

FIG. 5 depicts another exemplary login method in accordance with various disclosed embodiments. The exemplary login method may include a first terminal to login an application account.

In Step 402, the first terminal sends a request for logging in an application account to a server. For example, the request for logging in an application account may contain login information and ID of the first terminal. The login information may include login name and login password. The ID of the first terminal may include an identity or an identification code of the first terminal, such as, for example, an International Mobile Equipment Identity (IMEI) of a mobile phone.

Further, the login information of the application account can include first login information and second login information. The first login information can include, for example, original login information of the application account. The second login information can include, for example, additional login information bound with the application account.

In Step 404, the first terminal receives second verification information inputted in the first terminal, the second verification information is the information inputted according to the first verification information. The first verification information includes information sent to the second terminal, when the server detects that the first terminal is not included in the frequently used terminals corresponding to the application account.

If the server, via the ID of the first terminal, detects that the first terminal is not included in the frequently used terminals corresponding to the application account, the first verification information can be sent to the second terminal bounded with the application account, such that the user inputs the first verification information in the first terminal according to the first verification information. The first verification information may include a message verification code.

In Step 406, the first terminal sends the second verification information to the server for the server to detect if the second verification information matches the first verification information. The first terminal can send the second verification information inputted by the user based on the first verification information to the server. After the server verifies that the second verification information and the first verification information are matched, the server can respond to the first terminal that requests for logging in the application account and allow the first terminal to log in the application account.

In Step 408, the first terminal logs in the application account, when the server detects that the second verification information matches the first verification information.

For example, after the first terminal successfully logs in the application account, the user may also edit the frequently used terminals corresponding to the application account in the first terminal. Specifically, the first terminal may receive and display the ID list of the frequently used terminals server corresponding to the application account sent by the server. The first terminal may receive a command, inputted by user in the first terminal, to edit the ID list of the frequently used terminals. According to the command, the first terminal may send a request for editing the ID list of the frequently used terminals to the server, such that the server may edit the ID list of the frequently used terminals according to the request for editing the ID list of the frequently used terminals.

Figure 6:
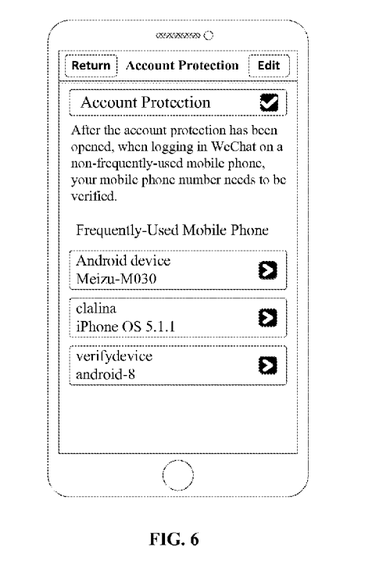
FIG. 6 depicts an exemplary ID list of frequently used terminals in accordance with various disclosed embodiments.

FIG. 6 depicts an exemplary ID list of the frequently used terminals. For example, when a user click/tap/hit the "Edit" button, e.g., on the upper right of the screen of an exemplary terminal, a command to remove an ID from the ID list of the frequently used terminals may be sent. After the user click an ID of a terminal in the ID list of the frequently used terminals, a command to rename the clicked ID may be sent to the clicked ID. The first terminal according to the command may send a request for editing to the server. The server according to the editing request can edit the ID in the ID list of the frequently used terminals.

In this manner, as shown in FIGS. 5-6, when requesting for logging in the application account to the server, the second verification information inputted in the first terminal according to the first verification information can be sent to the server. The server detects if the second verification information and the first verification information are matched. After the server verifies a matching there-between, the application account can be logged in. The first verification information includes information sent to the second terminal, when the server detects the first terminal is not included in the frequently used terminals corresponding to the application account. As such, the problems that the network application may be logged in by undesired other users when login information leakage occurs can be solved. Security of the application accounts can be improved.

Figure 7:
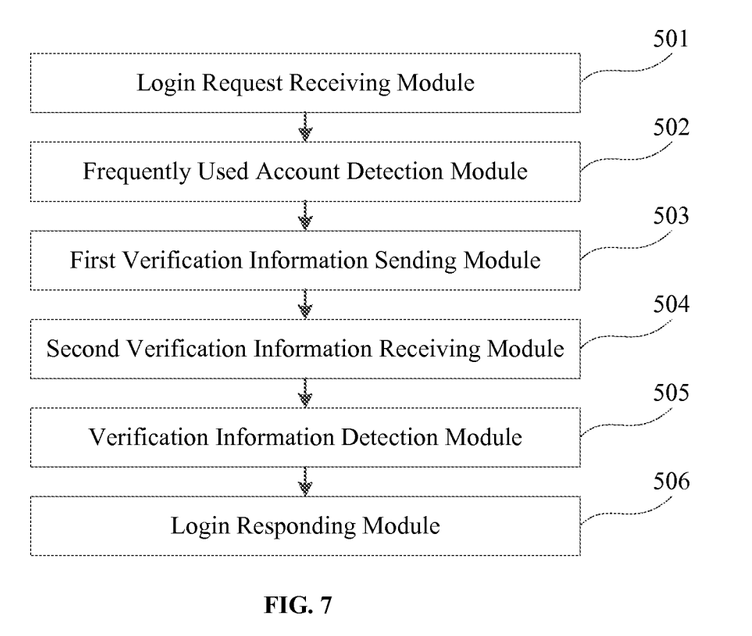
FIG. 7 depicts an exemplary login verification apparatus in accordance with various disclosed embodiments.

FIG. 7 depicts an exemplary login verification apparatus in accordance with various disclosed embodiments. The exemplary apparatus for login verification can be a part or a whole of a server, via software products and/or hardware, to respond to a request for logging in an application account sent from a terminal.

The exemplary apparatus for login verification can include a login request receiving module 501, a frequently used account detection module 502, a first verification information sending module 503, a second verification information receiving module 504, a verification information detection module 505, and/or a login responding module 506.

The login request receiving module 501 can be configured to receive a request for logging in an application account sent from the first terminal. The frequently used account detection module 502 can be configured to detect if the first terminal is included in the frequently used terminals corresponding to the application account.

The first verification information sending module 503 can be configured to send first verification information to a second terminal bounded with the application account, if the frequently used account detection module 502 detects that the first terminal is not included in the frequently used terminals corresponding to the application account.

The second verification information receiving module 504 can be configured to receive the second verification information sent from the first terminal. The verification information detection module 505 can be configured to detect if the second verification information received by the second verification information receiving module 504 matches the first verification information sent by the first verification information sending module 503.

The login responding module 506 can be configured to respond to the request for logging in the application account, if the verification information detection module 505 detects that the second verification information matches the first verification information.

In this manner, it can be detected if the first terminal that requests for logging in the application account is included in the frequently used terminals corresponding to the application account. If the first terminal is not included in the frequently used terminals corresponding to the application account, the first verification information can be sent to the second terminal bounded with the application account. It can be detected if the second verification information received by the first terminal matches the first verification information. If they are matched, the request for logging in the application account is responded. As such, the problems that the network application may be logged in by undesired other users when the additionally bound login information leakage occurs can be solved. Security of the application accounts can be improved.

Figure 8:
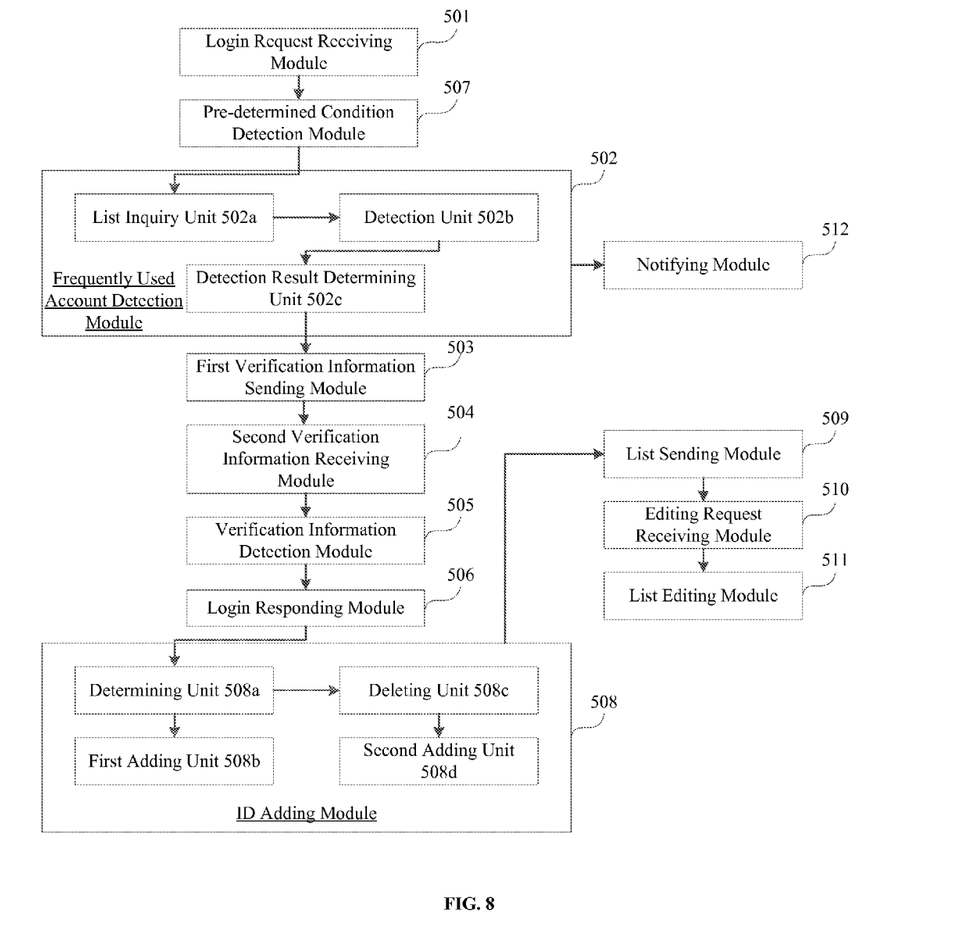
FIG. 8 depicts another exemplary login verification apparatus in accordance with various disclosed embodiments.

FIG. 8 depicts an exemplary login verification apparatus in accordance with various disclosed embodiments. The exemplary apparatus for login verification can be a part or a whole of a server, via software products and/or hardware, to respond to a request for logging in an application account sent from a terminal.

The exemplary apparatus for login verification can include a login request receiving module 501, a frequently used account detection module 502, a first verification information sending module 503, a second verification information receiving module 504, a verification information detection module 505, and/or a login responding module 506.

The login request receiving module 501 can be configured to receive a request for logging in an application account sent from the first terminal. The frequently used account detection module 502 can be configured to detect if the first terminal is included in the frequently used terminals corresponding to the application account.

The first verification information sending module 503 can be configured to send first verification information to a second terminal bounded with the application account, if the frequently used account detection module 502 detects that the first terminal is not included in the frequently used terminals corresponding to the application account.

The second verification information receiving module 504 can be configured to receive the second verification information sent from the first terminal. The verification information detection module 505 can be configured to detect if the second verification information received by the second verification information receiving module 504 matches the first verification information sent by the first verification information sending module 503.

The login responding module 506 can be configured to respond to the request for logging in the application account, if the verification information detection module 505 detects that the second verification information matches the first verification information.

The frequently used account detection module 502 can include a list inquiry unit 502a, a detection unit 502b, and/or a detection result determining unit 502c. The list inquiry unit 502a can be configured to inquire an ID list of the frequently used terminals corresponding to the application account. The detection unit 502b can be configured to detect if an ID of the first terminal is included in the ID list of the frequently used terminals found by the list inquiry unit 502a.

The detection result determining unit 502c can be configured to determine a detection result that the first terminal is not included in the frequently used terminals corresponding to the application account, if the ID of the first terminal is not included in the ID list of the frequently used terminals found by the list inquiry unit 502a. The request for logging in the application account received by the login request receiving module 501 can include an ID of the first terminal.

The exemplary login verification apparatus can further include a pre-determined condition detection module 507. The pre-determined condition detection module 507 can be configured to detect if a first pre-determined condition is established according to login information, before the frequently used account detection module 502 detects if the first terminal is included in the frequently used terminals corresponding to the application account.

For example, the frequently used account detection module 502 can be configured to perform the detection step to detect if the first terminal is included in the frequently used terminals corresponding to the application account, when the pre-determined condition detection module 507 detects that the first pre-determined condition is established.

The first pre-determined condition includes at least one condition selected from: that the application account has opened an account protection function or that the login information includes second login information.

The request for logging in an application account received by the login request receiving module 501 can include login information. The login information includes first login information or second login information. The first login information can include, for example, original login information of the application account. The second login information can include, for example, additional login information bound with the application account.

The exemplary login verification apparatus can further include an ID adding module 508. The ID adding module 508 can be configured to add the ID of the first terminal to the ID list of the frequently used terminals inquired by the list inquiry unit 502a, after the login responding module 506 responds to the request for logging in the application account.

The ID adding module 508 can include a determining unit 508a, a first adding unit 508b, a deleting unit 508c, and/or a second adding unit 508d.

The determining unit 508a can be configured to determine if number of IDs in the ID list of the frequently used terminals reaches a pre-determined threshold. The first adding unit 508b can be configured to add the ID of the first terminal to the ID list of the frequently used terminals, if the determining unit 508a determines the number of IDs in the ID list of the frequently used terminals is less than the pre-determined threshold.

The deleting unit 508c can be configured to remove an ID of another terminal, which is most recently logged in at an earliest time, from the ID list of the frequently used terminals, if the determining unit 508a determines the number of IDs in the ID list of the frequently used terminals reaches the pre-determined threshold.

The second adding unit 508d can be configured to add the ID of the first terminal to the ID list of the frequently used terminals, after the deleting unit 508c removes the ID of the another terminal, which is most recently logged in at the earliest time, from the ID list of the frequently used terminals.

The exemplary login verification apparatus can further include a list sending module 509, an editing request receiving module 510, and/or a list editing module 511.

The list sending module 509 can be configured to send the ID list of the frequently used terminals to the first terminal for the first terminal to display the ID list of the frequently used terminals. The editing request receiving module 510 can be configured to receive a request for editing the ID list of the frequently used terminals sent from the first terminal. The list editing module 511 can be configured to edit the ID list of the frequently used terminals, according to the request for editing the ID list of the frequently used terminals received by the editing request receiving module 510.

The exemplary login verification apparatus can further include a notifying module 512. The notifying module 512 can be configured to send an abnormal terminal login notification to the application account, when the frequently used account detection module 502 detects the first terminal is not included in the frequently used terminals corresponding to the application account, wherein the abnormal terminal login notification is a notification indicating a non-frequently-used terminal requests for a login to the application account.

The first verification information sending module 503 can be configured to send a verification message to the second terminal. The verification message can include the first verification information.

In this manner, it is detected if the first terminal that requests for logging in the application account is included in the frequently used terminals corresponding to the application account. If the first terminal is not included in the frequently used terminals corresponding to the application account, the first verification information is sent to the second terminal bounded with the application account. It is detected if the second verification information received by the first terminal matches the first verification information. If they are matched, the request for logging in the application account is responded. As such, the problems that the network application may be logged in by undesired other users when the additionally bound login information leakage occurs can be solved. Security of the application accounts can be improved.

Figure 9:
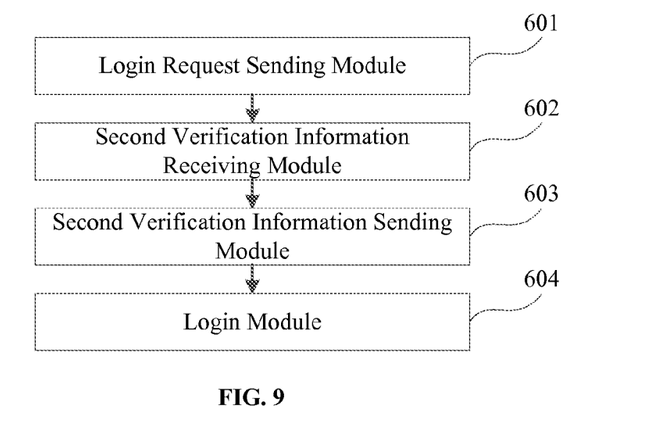
FIG. 9 depicts an exemplary login apparatus in accordance with various disclosed embodiments.

FIG. 9 depicts an exemplary login apparatus in accordance with various disclosed embodiments. The exemplary login apparatus can be a part or a whole of a first terminal via software products and/or hardware to login an application account.

The exemplary login apparatus can include a login request sending module 601, a second verification information receiving module 602, a second verification information sending module 603, and/or a login module 604. The login request sending module 601 can be configured to send a request for logging in an application account to a server.

The second verification information receiving module 602 can be configured to receive second verification information inputted in the first terminal. The second verification information can include information inputted according to first verification information. The first verification information can include information sent to the second terminal, when the server detects that the first terminal is not included in the frequently used terminals corresponding to the application account.

The second verification information sending module 603 can be configured to send to the server the second verification information received by the second verification information receiving module 602 for the server to detect if the second verification information matches the first verification information. The login module 604 can be configured to login the application account when the server detects that the second verification information matches the first verification information.

In this manner, as shown in FIG. 9, when requesting for logging in an application account to the server, the second verification information inputted in the first terminal according to the first verification information can be sent to the server. The server detects if the second verification information and the first verification information are matched. After the server verifies the matching there-between, the application account is logged in. The first verification information includes information sent to the second terminal, when the server detects the first terminal is not included in the frequently used terminals corresponding to the application account. As such, the problems that the network application may be logged in by undesired other users when login information leakage occurs can be solved. Security of the application accounts can be improved.

Figure 10:
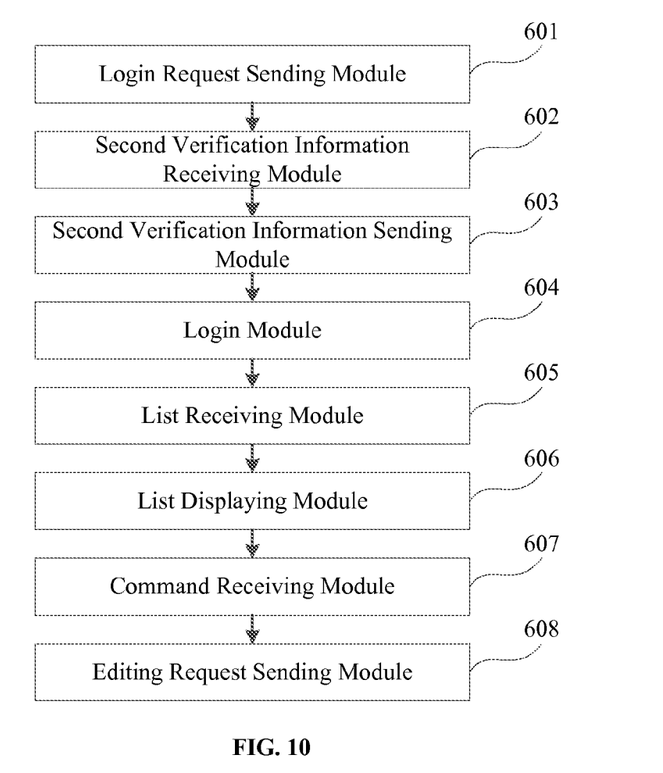
FIG. 10 depicts another exemplary login apparatus in accordance with various disclosed embodiments.

FIG. 10 depicts another exemplary login apparatus in accordance with various disclosed embodiments. The exemplary login apparatus can be a part or a whole of a first terminal via software products and/or hardware to login an application account.

The exemplary login apparatus can include a login request sending module 601, a second verification information receiving module 602, a second verification information sending module 603, and/or a login module 604. The login request sending module 601 can be configured to send a request for logging in an application account to a server.

The second verification information receiving module 602 can be configured to receive second verification information inputted in the first terminal. The second verification information can include information inputted according to first verification information. The first verification information can include information sent to the second terminal, when the server detects that the first terminal is not included in the frequently used terminals corresponding to the application account.

The second verification information sending module 603 can be configured to send to the server the second verification information received by the second verification information receiving module 602 for the server to detect if the second verification information matches the first verification information. The login module 604 can be configured to login the application account when the server detects that the second verification information matches the first verification information.

The exemplary login apparatus can further include a list receiving module 605, a list displaying module 606, a command receiving module 607, and/an editing request sending module 608.

The list receiving module 605 can be configured to receive an ID list of the frequently used terminals corresponding to the application account sent by the server. The list displaying module 606 can be configured to display the ID list of the frequently used terminals received by the list receiving module 605.

The command receiving module 607 can be configured to receive a command, inputted in the first terminal, to edit the ID list of the frequently used terminals displayed by the list displaying module 606. The editing request sending module 608 can be configured to send to the server a request for editing the ID list of the frequently used terminals, according to a command received by the command receiving module 607, such that the server can edit the ID list of the frequently used terminals according to the request for editing the ID list of the frequently used terminals.

In this manner, as shown in FIG. 10, when requesting for logging in the application account to the server, the second verification information inputted in the first terminal according to the first verification information can be sent to the server. The server detects if the second verification information and the first verification information are matched. After the server verifies the matching there between, the application account can be logged in. The first verification information includes information sent to the second terminal, when the server detects the first terminal is not included in the frequently used terminals corresponding to the application account. As such, the problems that the network application may be logged in by undesired other users when login information leakage occurs can be solved. Security of the application accounts can be improved.

Figure 11:
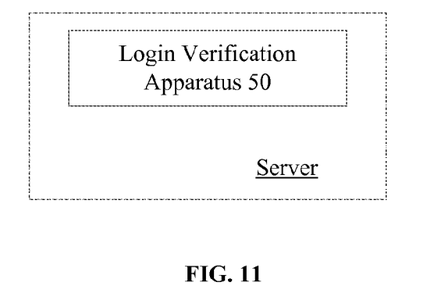
FIG. 11 depicts an exemplary server in accordance with various disclosed embodiments.

FIG. 11 depicts an exemplary server in accordance with various disclosed embodiments. The server may include a login verification apparatus 50, for example, as depicted in FIGS. 7-8. It can be detected if the first terminal that requests for logging in the application account is included in the frequently used terminals corresponding to the application account. If the first terminal is not included in the frequently used terminals corresponding to the application account, the first verification information is sent to the second terminal bounded with the application account. It can be detected if the second verification information received by the first terminal matches the first verification information. If they are matched, the request for logging in the application account can be responded. As such, the problems that the network application may be logged in by undesired other users when the additionally bound login information leakage occurs can be solved. Security of the application accounts can be improved.

Figure 12:
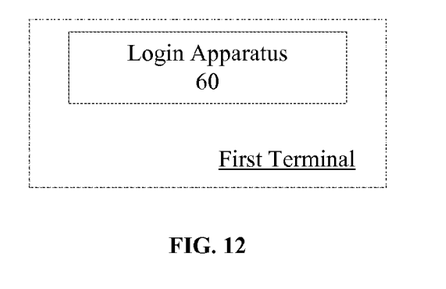
FIG. 12 depicts an exemplary first terminal in accordance with various disclosed embodiments.

FIG. 12 depicts an exemplary first terminal in accordance with various disclosed embodiments. The exemplary first terminal can include a login apparatus 60, for example, as depicted in FIGS. 9-10. By requesting the server for logging in the application account, the second verification information, inputted in the first terminal according to the first verification information, is sent to the server such that the server can detect if the second verification information matches the first verification information. Once server verifies the matching there-between, the first terminal can be logged in the application account. The first verification information includes information sent to the second terminal, when the server detects that the first terminal is not included in the frequently used terminals corresponding to the application account. As such, the problems that the network application may be logged in by undesired other users when the additionally bound login information leakage occurs can be solved. Security of the application accounts can be improved.

Figure 13:
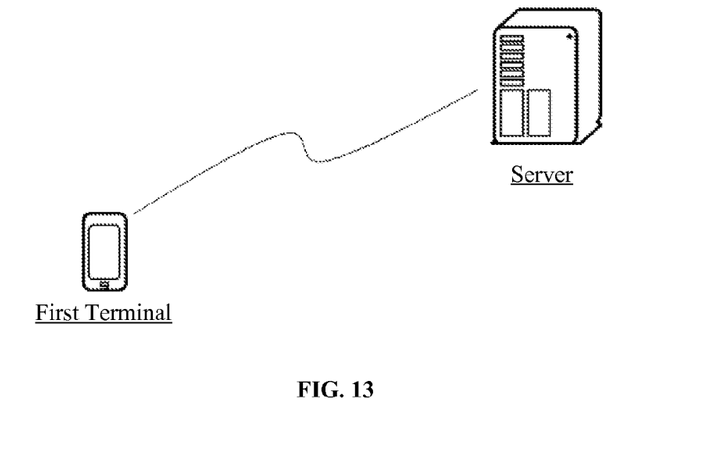
FIG. 13 depicts an exemplary login system in accordance with various disclosed embodiments.

FIG. 13 depicts an exemplary login system in accordance with various disclosed embodiments. The exemplary login system may include an exemplary server such as the server depicted in FIG. 11 and an exemplary first terminal such as the first terminal depicted in FIG. 12

In the exemplary login system, a server detects if a first terminal requesting for logging in an application account is included in frequently used terminals corresponding to the application account. If the first terminal is detected not included in the frequently used terminals corresponding to the application account, the server may send a first verification information to a second terminal bounded with the application account, and detect if a second verification information received by the first terminal matches the first verification information. If they are matched, the server may respond to the request for logging in the application account. As such, the problems that the network application may be logged in by undesired other users when the additionally bound login information leakage occurs can be solved. Security of the application accounts can be improved.

In various embodiments, the disclosed modules/units in the exemplary apparatus/system for login and/or login verification as depicted above can be configured in one device or configured in multiple devices as desired. The modules disclosed herein can be integrated in one module or in multiple modules for processing messages. Each of the modules disclosed herein can be divided into one or more sub-modules, which can be recombined in any manners. The exemplary apparatus/system in FIGS. 7-13 can be used to perform the above-disclosed methods, e.g., in FIGS. 1-6.

Figure 15:
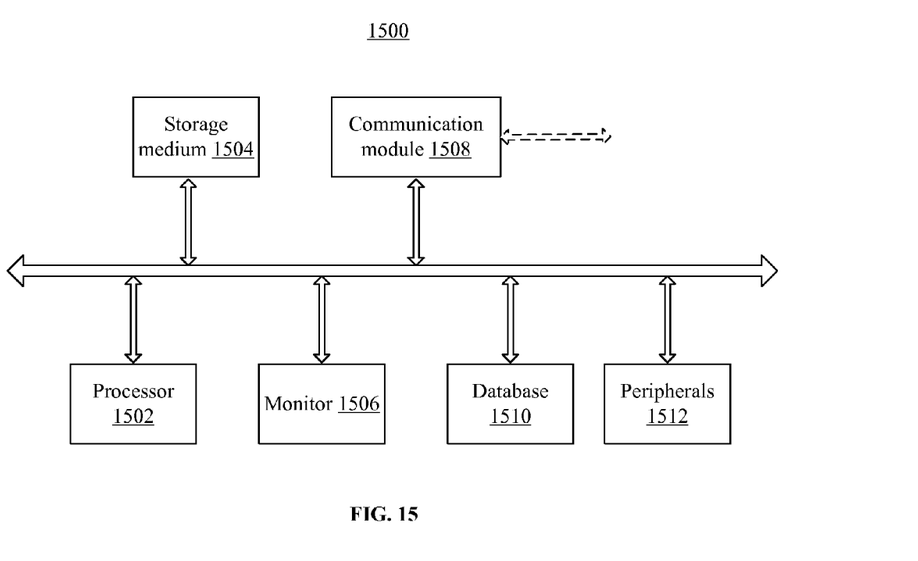
FIG. 15 depicts an exemplary computing system in accordance with various disclosed embodiments.

The disclosed embodiments can be examples only. One of ordinary skill in the art would appreciate that suitable software and/or hardware (e.g., a universal hardware platform) may be included and used to perform the disclosed methods. For example, the disclosed embodiments can be implemented by hardware only, which alternatively can be implemented by software products only. The software products can be stored in a storage medium (e.g., as shown in FIG. 15). The software products can include suitable commands to enable a terminal device (e.g., including a mobile phone, a personal computer, a server, or a network device, etc.) to implement the disclosed embodiments.

Figure 14:
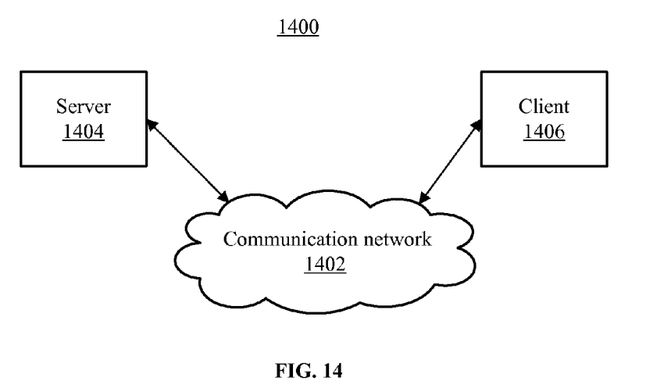
FIG. 14 depicts an exemplary environment incorporating certain disclosed embodiments.

FIG. 14 depicts an exemplary environment 1400 incorporating certain disclosed embodiments. As shown in FIG. 14, environment 1400 may include a server 1404, a terminal or a client 1406, and/or a communication network 1402. The server 1404 and the client 1406 may be coupled through the communication network 1402 for information exchange, such as obtaining web data. Although only one client 1406 and one server 1404 are shown in the environment 1400, any number of clients 1406 or servers 1404 may be included, and other devices may also be included.

Communication network 1402 may include any appropriate type of communication network for providing network connections to the server 1404 and client 1406 or among multiple servers 1404 or clients 1406. For example, communication network 1402 may include the Internet or other types of computer networks or telecommunication networks, either wired or wireless.

A terminal or a client, as used herein, may refer to any appropriate user terminal with certain computing capabilities, such as a personal computer (PC), a work station computer, a server computer, a hand-held computing device (tablet), a smart phone or mobile phone, or any other user-side computing device. Such terminals can be used in the disclosed methods, apparatus, and/or systems as depicted in FIGS. 1-13.

A server, as used herein, may refer to one or more server computers configured to provide certain server functionalities, such as database management and search engines. A server may also include one or more processors to execute computer programs in parallel. In one embodiment, the server can be used in the disclosed methods, apparatus, and/or systems as depicted in FIGS. 1-13.

Server 1404 and/or client 1406 may be implemented on any appropriate computing platform. FIG. 15 shows a block diagram of an exemplary computing system 1500 capable of implementing server 1504 and/or client 1506.

As shown in FIG. 15, computing system 1500 may include a processor 1502, a storage medium 1504, a monitor 1506, a communication module 1508, a database 1510, and/or peripherals 1512. Certain devices may be omitted and other devices may be included.

Processor 1502 may include any appropriate processor or processors. Further, processor 1502 can include multiple cores for multi-thread or parallel processing. Storage medium 1504 may include memory modules, such as ROM, RAM, flash memory modules, and erasable and rewritable memory, and mass storages, such as CD-ROM, U-disk, and hard disk, etc. Storage medium 1504 may store computer programs for implementing various processes, when executed by processor 1502.

Further, peripherals 1512 may include I/O devices such as keyboard and mouse, and communication module 1508 may include network devices for establishing connections through the communication network 1502. Database 1510 may include one or more databases for storing certain data and for performing certain operations on the stored data, such as database searching.

Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Various embodiments provide methods, apparatus, and systems for logging in an application account. For example, there are provided: a login method for a server; a login method for a first terminal; a login verification apparatus; a login apparatus; a server including the disclosed login verification apparatus; a terminal including the disclosed login apparatus; a login system including the disclosed server; and/or a login system including the disclosed terminal.

A request for logging in an application account sent from a first terminal can be received. It is detected if the first terminal can be included in frequently used terminals corresponding to the application account. First verification information can be sent to a second terminal bound with the application account, when it is detected the first terminal is not included in the frequently used terminals corresponding to the application account. Second verification information can be received from the first terminal to detect if the second verification information matches the first verification information. When it is detected that the second verification information matches the first verification information, the request for logging in the application account can be responded.

It is detected if the first terminal that requests for logging in the application account is a frequently used terminal. If the first terminal is not the frequently used terminal corresponding to the application account, the first verification information can be sent to the second terminal bound with the application account. The second verification information is then received by the first terminal and can be detected if it matches the first verification information. If they are matched, the request for logging in the application account can be responded. As such, the problems that the network application may be logged in by undesired other users when login information leakage occurs can be solved. Security of the application accounts can be improved.

What is claimed is:

1. A login method for a server, comprising:
   receiving a request for logging in an application account sent from a first terminal, wherein the request for logging in the application account contains login information and an ID of the first terminal, the login information including at least a unique login name for the application account and a login password;
   detecting if the first terminal is included in identified terminals corresponding to the application account;
   sending first verification information to a second terminal bound with the application account, if it is detected the first terminal is not included in the identified terminals corresponding to the application account;
   receiving second verification information from the first terminal to detect if the second verification information matches the first verification information; and
   responding to the request for logging in the application account on the first terminal, if it is detected the second verification information matches the first verification information;
   wherein detecting if the first terminal is included in the identified terminals corresponding to the application account comprises:
   inquiring an ID list of the identified terminals corresponding to the application account; and
   determining if the ID of the first terminal is on the ID list of the identified terminals by checking the ID of the first terminal against the ID list of the identified terminals.

2. The method of claim 1, wherein the login information comprising first login information or second login information, the first login information comprising original login information of the application account, and the second login information comprising additional login information bound with the application account, and wherein, before detecting if the first terminal is included in the identified terminals corresponding to the application account, the method further comprises:
   detecting if a first pre-determined condition is established according to the login information;
   detecting if the first terminal is included in the identified terminals corresponding to the application account when the first pre-determined condition is detected to be established, wherein the first pre-determined condition comprises at least one condition selected from: that the application account has opened an account protection function and that the login information includes the second login information; and
   directly sending the first verification information to the second terminal bound with the application account when the first pre-determined condition is detected to be not established.

3. The method of claim 1, wherein, after responding to the request for logging in the application account, the method further comprises:
   adding the ID of the first terminal to the ID list of the identified terminals.

4. The method of claim 3, wherein adding the ID of the first terminal to the ID list of the identified terminals further comprises:
   determining if number of IDs in the ID list of the identified terminals identification reaches a pre-determined threshold;
   adding the ID of the first terminal to the ID list of the identified terminals, if the number of IDs in the ID list of the identified terminals is less than the pre-determined threshold;
   removing an ID of another terminal, that is most recently logged in at an earliest time, from the ID list of the identified terminals, if the pre-determined threshold is reached; and
   adding the ID of the first terminal to the ID list of the identified terminals.

5. The method of claim 1, wherein after responding to the request for logging in the application account, the method further comprises:
   sending the ID list of the identified terminals to the first terminal for the first terminal to display the ID list of the identified terminals to a user of the first terminal that has logged in with the application account;
   receiving a request for editing the ID list of the identified terminals from the user of the first terminal; and
   editing the ID list of the identified terminals according to the request for editing the ID list of the identified terminals, wherein the editing request from the user includes one or more of deleting an ID of a terminal from the ID list and renaming an ID of a terminal in the ID list.

6. The method of claim 1, wherein it is detected that the first terminal is not included in the identified terminals corresponding to the application account, and the method further comprises:
   sending an abnormal terminal login notification to the application account, when it is detected that the first terminal is not included in the identified terminals corresponding to the application account,
   wherein the abnormal terminal login notification is a notification indicating a terminal that is not one of the identified terminals requests for logging in to the application account.

7. The method of claim 1, wherein sending the first verification information to the second terminal bound with the application account further comprises:
   sending a verification message to the second terminal, wherein the verification message comprises the first verification information.

8. A login method for a first terminal, comprising:
   sending a request for logging in an application account to a server, wherein the request for logging in the application account contains login information and an ID of the first terminal, the login information including at least a unique login name for the application account and a login password;
   receiving second verification information inputted in the first terminal, wherein the second verification information comprises information inputted according to first verification information, the first verification information comprising information sent to a second terminal when the server detects that the first terminal is not included in identified terminals corresponding to the application account;
   sending the second verification information to the server to detect if the second verification information matches the first verification information; and
   logging in the application account when the server detects that the second verification information matches the first verification information;
   wherein the server detecting that the first terminal is not included in identified terminals corresponding to the application account further comprises:
      inquiring an ID list of the identified terminals corresponding to the application account; and
      determining if the ID of the first terminal is on the ID list of the identified terminals by checking the ID of the first terminal against the ID list of the identified terminals.

9. The method of claim 8, further comprising:
   receiving and displaying an ID list of the identified terminals corresponding to the application account sent by the server;
   receiving a command inputted in the first terminal to edit the ID list of the identified terminals, wherein the command is inputted by a user of the first terminal that has logged in with the application account, and
   sending a request for editing the ID list of the identified terminals to the server according to the command, such that the server edits the ID list of the identified terminals according to the request for editing the ID list of the identified terminals, wherein the editing request from the user includes one or more of deleting an ID of a terminal from the ID list and renaming an ID of a terminal in the ID list.

10. A login verification apparatus, comprising
   a login request receiving module, configured to receive a request for logging in an application account sent from a first terminal, wherein the request for logging in the application account contains login information and an ID of the first terminal, the login information including at least a unique login name for the application account and a login password;
   a frequently used account detection module, configured to detect if the first terminal is included in identified terminals corresponding to the application account;
   a first verification information sending module, configured to send first verification information to a second terminal bounded with the application account, when the frequently used account detection module detects that the first terminal is not included in the identified terminals corresponding to the application account;

a second verification information receiving module, configured to receive second verification information sent from the first terminal;

a verification information detection module, configured to detect if the second verification information received by the second verification information receiving module matches the first verification information sent by the first verification information sending module; and a login responding module, configured to respond to the request for logging in the application account, when the verification information detection module detects that the second verification information matches the first verification information;

wherein the frequently used account detection module comprises:

a list inquiry unit, configured to inquire an ID list of the identified terminals corresponding to the application account;

a detection unit, configured to detect if the ID of the first terminal is included in the ID list of the identified terminals found by the list inquiry unit; and a detection result determining unit, configured to determine a detection result that the first terminal is not included in the identified terminals corresponding to the application account, when the ID of the first terminal is not included in the ID list of the identified terminals found by the list inquiry unit.

11. The apparatus of claim 10, further comprising:

a pre-determined condition detection module, configured to detect if a first pre-determined condition is established according to login information, before the frequently used account detection module detects if the first terminal is included in the identified terminals corresponding to the application account, wherein the frequently used account detection module is configured to detect if the first terminal is included in the identified terminals corresponding to the application account, when the pre-determined condition detection module detects that the first pre-determined condition is established;

wherein the first verification information sending module is configured to directly send the first verification information to the second terminal bound with the application account when the first pre-determined condition is detected to be not established;

wherein the first pre-determined condition comprises at least one condition selected from: that the application account has opened an account protection function or that the login information includes second login information; and wherein the request for logging in an application account received by the login request receiving module comprises the login information, the login information comprising first login information or the second login information, the first login information comprising original login information of the application account, and the second login information comprising additional login information bound with the application account.

12. The apparatus of claim 10, further comprising:

an ID adding module, configured to add the ID of the first terminal to the ID list of the identified terminals inquired by the list inquiry unit, after the login responding module responds to the request for logging in the application account.

13. The apparatus of claim 12, wherein the ID adding module comprises:

a determining unit, configured to determine if number of IDs in the ID list of the identified terminals reaches a pre-determined threshold;

a first adding unit, configured to add the ID of the first terminal to the ID list of the identified terminals when the determining unit determines the number of IDs in the ID list of the identified terminals is less than the pre-determined threshold;

a deleting unit, configured to remove an ID of another terminal, which is most recently logged in at an earliest time, from the ID list of the identified terminals, when the determining unit determines the number of IDs in the ID list of the identified terminals reaches the pre-determined threshold; and a second adding unit, configured to add the ID of the first terminal to the ID list of the identified terminals, after the deleting unit removes the ID of the another terminal, which is most recently logged in at the earliest time, from the ID list of the identified terminals.

14. The apparatus of claim 10, further comprising:

a list sending module, configured to send the ID list of the identified terminals to the first terminal to display the ID list of the identified terminals to a user of the first terminal that has logged in with the application account;

an editing request receiving module, configured to receive a request for editing the ID list of the identified terminals sent from the user of the first terminal; and a list editing module, configured to edit the ID list of the identified terminals according to the request for editing the ID list of the identified terminals received by the editing request receiving module, wherein the editing request includes one or more of deleting an ID of a terminal from the ID list and renaming an ID of a terminal in the ID list.

15. The apparatus of claim 10, further comprising:

a notifying module, configured to send an abnormal terminal login notification to the application account when the frequently used account detection module detects the first terminal is not included in the identified terminals corresponding to the application account, wherein the abnormal terminal login notification is a notification indicating a non-frequently-used terminal requests for a login to the application account.

16. The apparatus of claim 10, wherein the first verification information sending module is configured to send a verification message to the second terminal and the verification message comprises the first verification information.

17. A login apparatus comprising a first terminal, wherein the first terminal comprises:

a login request sending module, configured to send a request for logging in an application account to a server, wherein the request for logging in the application account contains login information and an ID of the first terminal, and the login information including at least a unique login name for the application account and a login password;

a second verification information receiving module, configured to receive second verification information inputted in the first terminal, the second verification information comprising information inputted according to first verification information, and the first verification information comprising information sent to the second terminal when the server detects that the first terminal is not included in identified terminals corresponding to the application account;

a second verification information sending module, configured to send to the server the second verification information received by the second verification information receiving module for the server to detect if the second verification information matches the first verification information; and a login module, configured to login the application account when the server detects that the second verification information matches the first verification information;

wherein the server detecting that the first terminal is not included in identified terminals corresponding to the application account further comprises:

inquiring an ID list of the identified terminals corresponding to the application account; and determining if the ID of the first terminal is on the ID list of the identified terminals by checking the ID of the first terminal against the ID list of the identified terminals.

18. The apparatus of claim 17, further comprising:

a list receiving module, configured to receive an ID list of the identified terminals corresponding to the application account sent by the server;

a list displaying module, configured to display the ID list of the identified terminals received by the list receiving module;

a command receiving module, configured to receive a command, inputted in the first terminal, to edit the ID list of the identified terminals displayed by the list displaying module, wherein the command is inputted through the application account associated with the first terminal; and an editing request sending module, configured to send to the server a request for editing the ID list of the identified terminals, according to the command received by the command receiving module for the server to edit the ID list of the identified terminals according to the request for editing the ID list of the identified terminals, wherein the editing request includes one or more of deleting an ID of a terminal from the ID list and renaming an ID of a terminal in the ID list.

19. The method of claim 2, further comprising:

when the application account has bound with the second terminal and the second login information, and an account protection function of the application account is closed, if a request for opening the account protection function of the application account is sent, sending, by the server, the first verification information to the second terminal;

receiving the second verification information sent by the first terminal;

opening the account protection function of the application account after the second verification information and the first verification information are verified that matches with each other; and adding the ID of the first terminal to the ID list of the identified terminals.

20. The method of claim 1, wherein:

when the first terminal is a mobile phone, the ID of the first terminal includes an International Mobile Equipment Identity (IMEI) of the mobile phone.

* * * * *